United States Patent
Bailey et al.

(10) Patent No.: US 11,592,805 B2
(45) Date of Patent: Feb. 28, 2023

(54) COMPUTING DEVICE EXPANSION MODULES AND CONTROL OF THEIR OPERATION BASED ON TEMPERATURE

(71) Applicant: Lenovo Enterprise Solutions (Singapore) Pte. Ltd., New Tech Park (SG)

(72) Inventors: Warren Bailey, Research Triangle Park, NC (US); Patrick Caporale, Research Triangle Park, NC (US); Alfredo Aldereguia, Research Triangle Park, NC (US); Brett Scrivner, Research Triangle Park, NC (US); Michael DeCesaris, Research Triangle Park, NC (US); Mark McCool, Research Triangle Park, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 359 days.

(21) Appl. No.: 16/836,698

(22) Filed: Mar. 31, 2020

(65) Prior Publication Data

US 2021/0302939 A1  Sep. 30, 2021

(51) Int. Cl.
| | | |
|---|---|---|
| *G06F 13/10* | (2006.01) | |
| *G06F 1/20* | (2006.01) | |
| *G05B 19/416* | (2006.01) | |
| *G05D 23/19* | (2006.01) | |
| *G06F 9/448* | (2018.01) | |

(52) U.S. Cl.
CPC ....... *G05B 19/416* (2013.01); *G05D 23/1917* (2013.01); *G06F 1/206* (2013.01); *G06F 9/448* (2018.02); *G06F 13/10* (2013.01); *G05B 2219/37431* (2013.01)

(58) Field of Classification Search
CPC ........ G05B 19/416; G05B 2219/37431; G06F 9/448; G06F 1/206; G06F 13/10; G05D 23/1917
USPC .......................................................... 713/300
See application file for complete search history.

(56) References Cited

U.S. PATENT DOCUMENTS

| | | | |
|---|---|---|---|
| 8,928,393 B1 | 1/2015 | Cobo et al. | |
| 9,298,662 B2 | 3/2016 | Campbell et al. | |
| 2015/0355651 A1* | 12/2015 | Balakrishnan | G06F 9/442 700/299 |
| 2016/0246754 A1* | 8/2016 | Rao | G06F 13/4068 |

(Continued)

*Primary Examiner* — Christopher B Shin
(74) *Attorney, Agent, or Firm* — Olive Law Group, PLLC

(57) ABSTRACT

Computing device expansion modules and control of their operation based on temperature are disclosed. According to an aspect, an expansion module includes an interface configured to operably connect to a computing device including a service manager. Further, the expansion module includes a controller configured to determine whether communication with the service manager of the computing device is enabled or not enabled. The controller is also configured to set a first temperature level at which operation of the expansion module is reduced in response to determining that communication with the service manager is enabled. Further, the controller is configured to set a second temperature level at which operation of the expansion module is reduced in response to determining that communication with the service manager is not enabled. The second temperature level is lower than the first temperature level.

20 Claims, 5 Drawing Sheets

(56) References Cited

U.S. PATENT DOCUMENTS

| | | | |
|---|---|---|---|
| 2016/0274629 A1* | 9/2016 | Lovicott | G06F 1/206 |
| 2017/0185118 A1* | 6/2017 | Iwata | G05B 19/042 |
| 2017/0353032 A1* | 12/2017 | Ebbes | H02J 3/466 |
| 2019/0073285 A1* | 3/2019 | Hayashida | G06F 11/2221 |
| 2019/0303335 A1* | 10/2019 | Remis | G06F 13/362 |
| 2020/0097055 A1* | 3/2020 | Wang | G05B 15/02 |
| 2020/0143047 A1* | 5/2020 | Shivanna | G06F 21/57 |
| 2020/0323102 A1* | 10/2020 | Artman | H05K 7/20172 |
| 2021/0049059 A1* | 2/2021 | Bisa | G06F 11/0793 |
| 2021/0262958 A1* | 8/2021 | Shabbir | G06F 1/206 |
| 2021/0320490 A1* | 10/2021 | Lin | H02H 1/0092 |

\* cited by examiner

COMPUTING DEVICE EXPANSION MODULES AND CONTROL OF THEIR OPERATION BASED ON TEMPERATURE

TECHNICAL FIELD

The presently disclosed subject matter relates generally to computing device expansion modules. Particularly, the presently disclosed subject matter relates to computing device expansion modules and control of their operation based on temperature.

BACKGROUND

Computers, such as servers, desktop computers, and laptop computers, contain components which can dissipate a significant amount of heat. Thermal management must often be used in order to prevent these components from overheating. Two primary types of thermal management are used today for adapters or expansion modules. One type of thermal management is known as closed loop system. In a closed loop system, the expansion module sends thermal notifications to a control entity, such as a baseboard management controller (BMC), to indicate when various temperature thresholds have been reached. The BMC can respond by increasing the fan speed of the cooling fans in order to maintain the expansion module within its operating temperature limits.

Another type of thermal management is known as an open loop system. In an open loop system, there is no support for the messaging described in a closed loop system. The expansion module is unable to signal the BMC as temperature thresholds are reached. Instead, the BMC will detect the presence of the expansion module. Then by use of a lookup table or some other technique, the BMC pre-sets the cooling fan speed to a value which can cool the worst-case temperature conditions that the adapter is expected to experience.

Although these systems help to mitigate the risk of overheating, there is a continuing need for improved systems and techniques for thermal management of expansion modules.

BRIEF DESCRIPTION OF THE DRAWINGS

Figure 1:
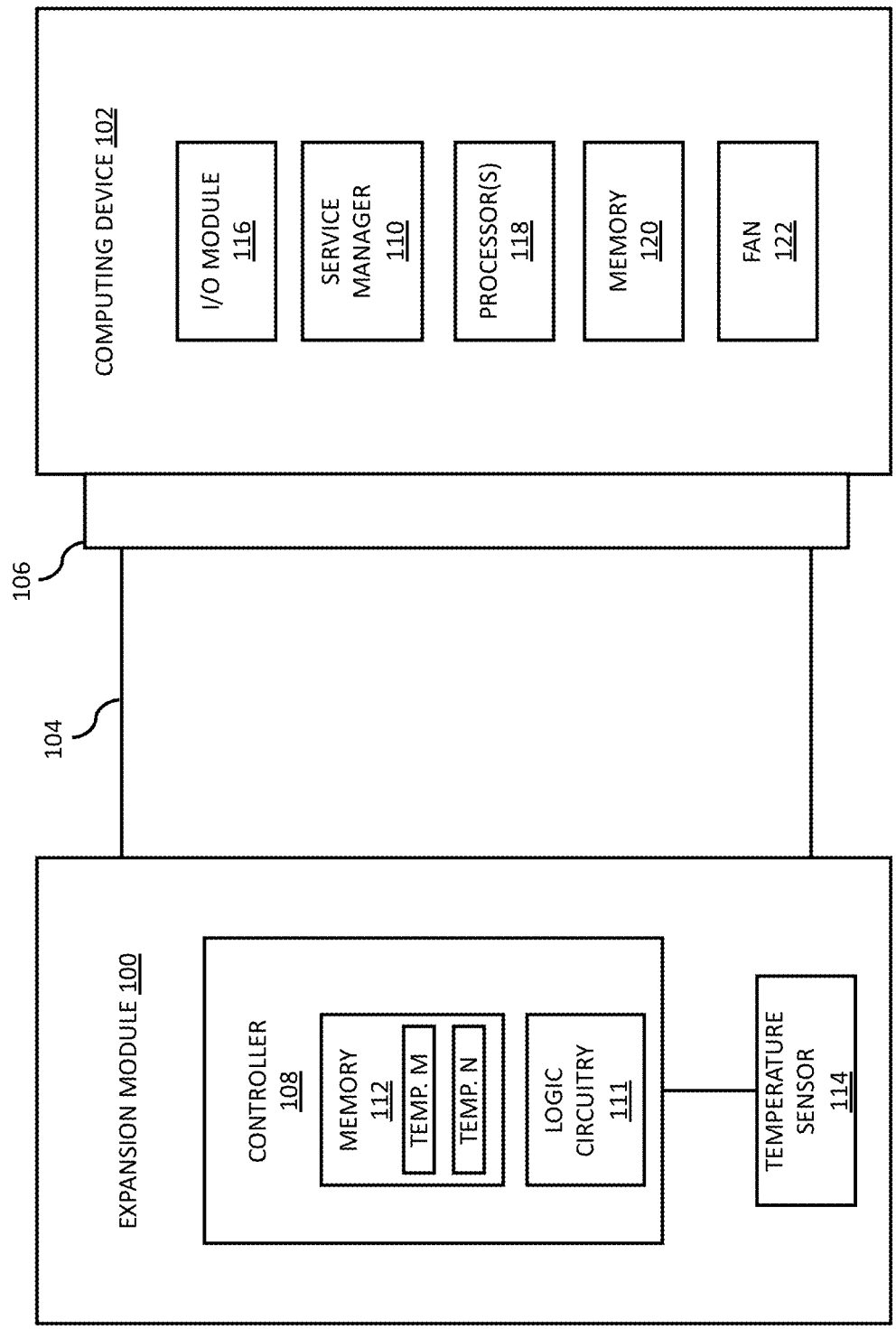
Figure 2:
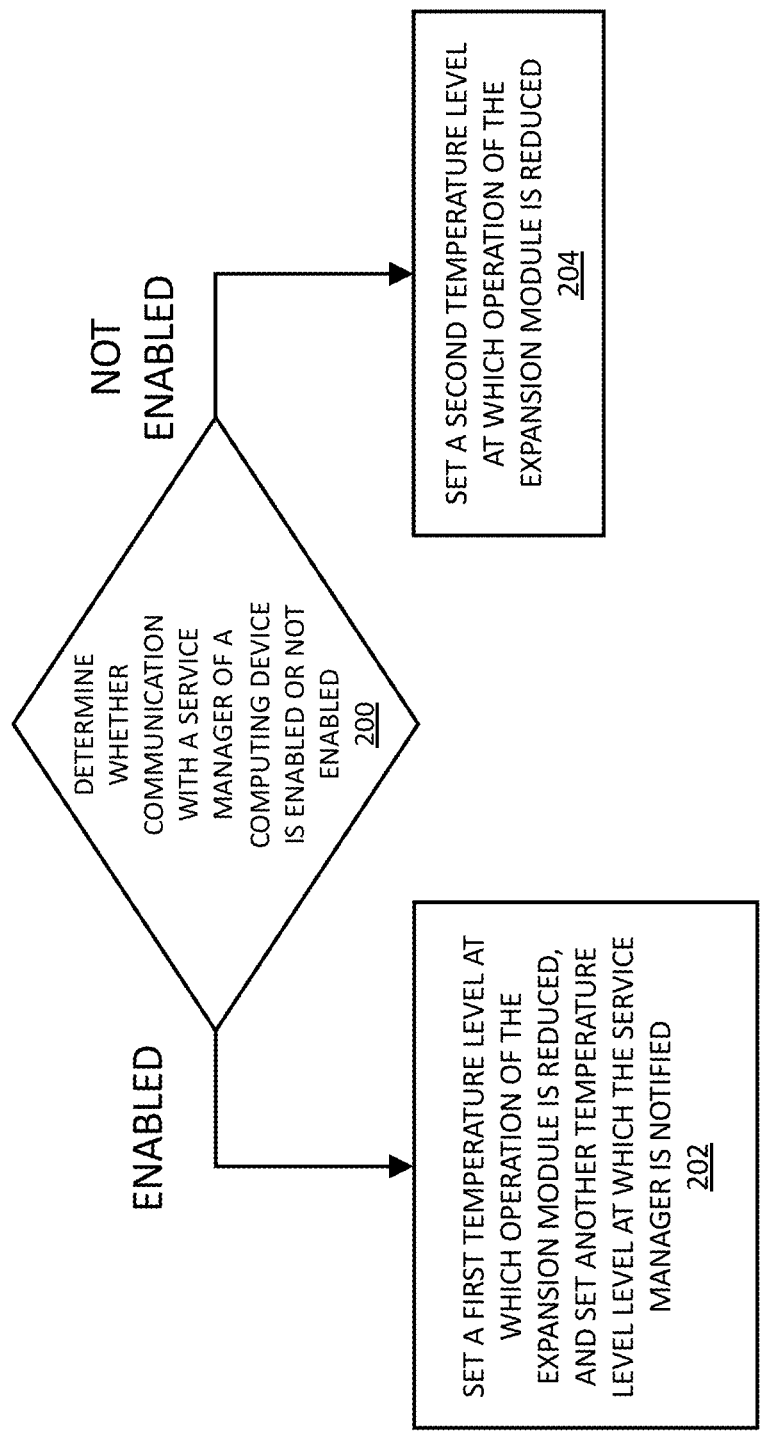
Figure 3:
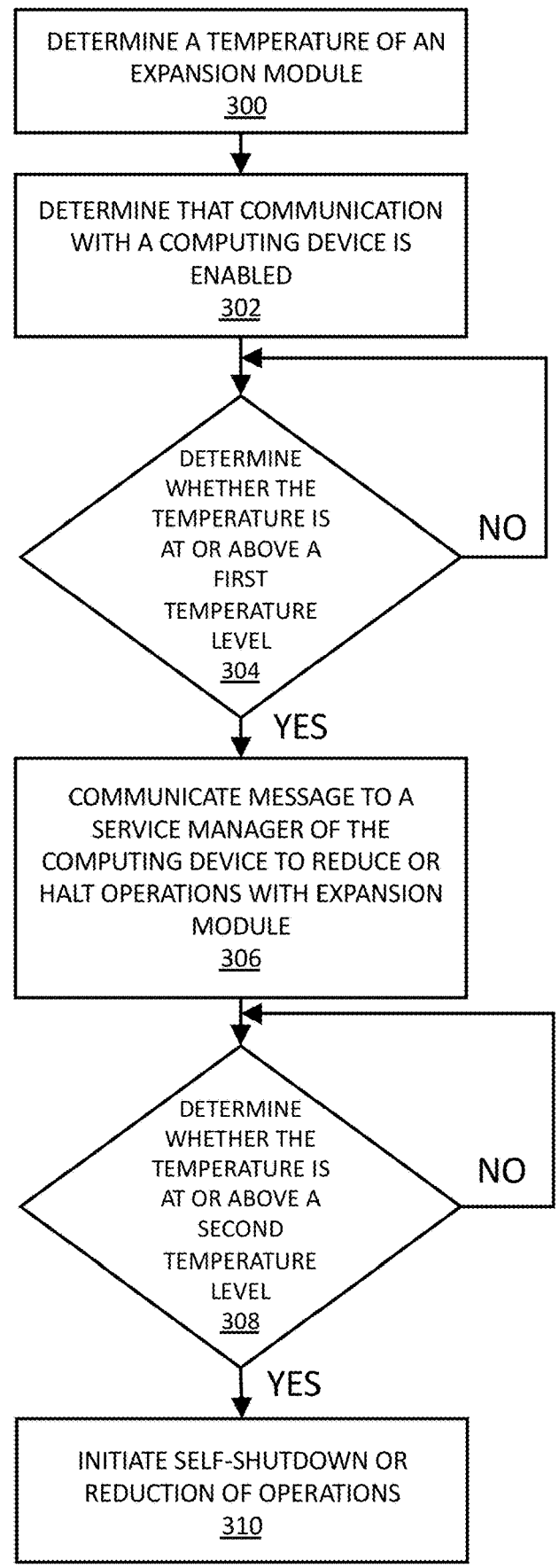
Figure 4:
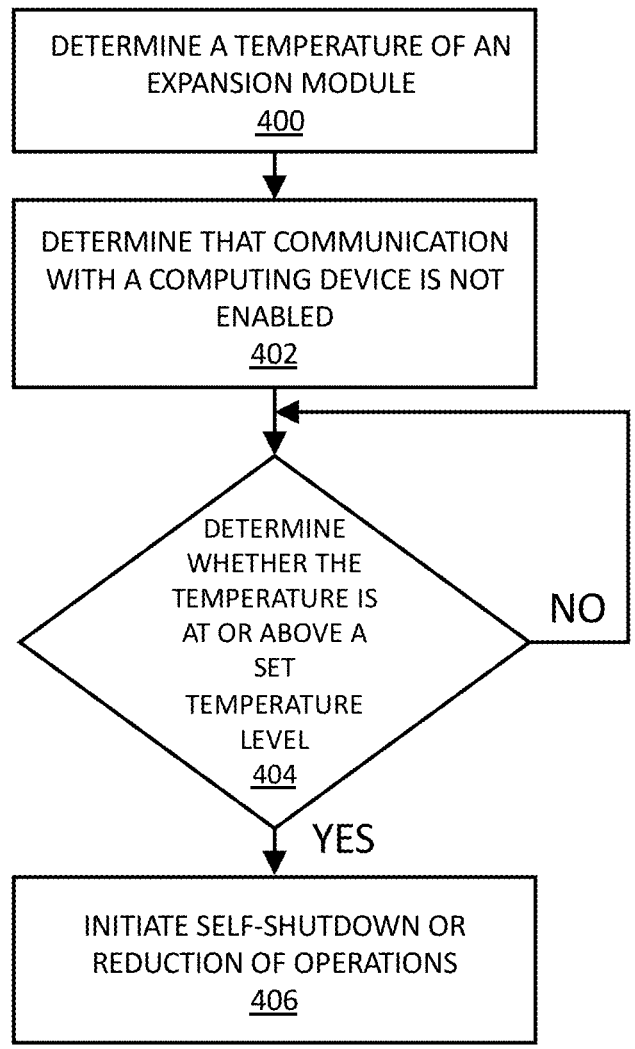
Figure 5:
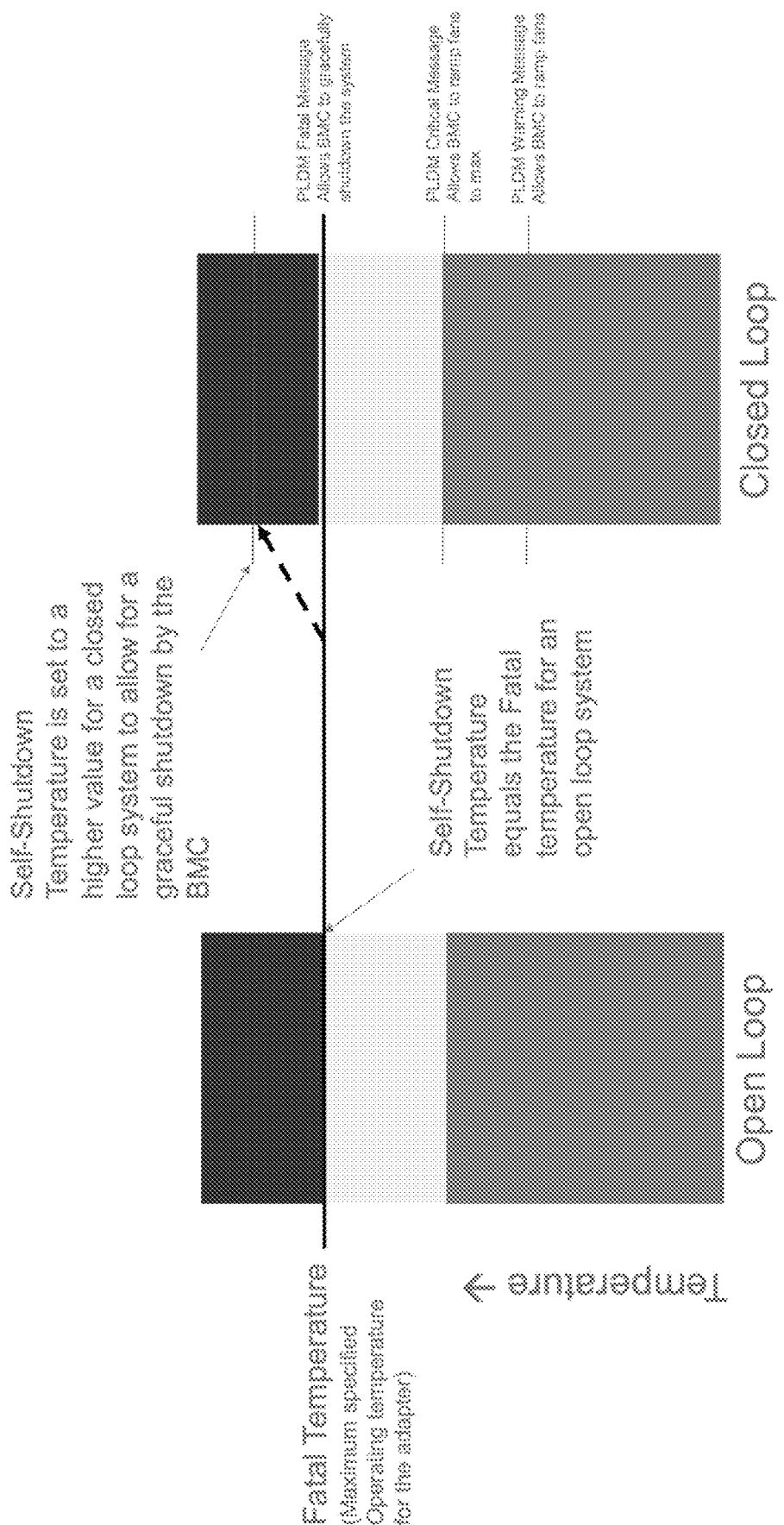

Having thus described the presently disclosed subject matter in general terms, reference will now be made to the accompanying Drawings, which are not necessarily drawn to scale, and wherein:

FIG. 1 is a block diagram of an expansion module and computing device that are operably connected in accordance with embodiments of the present disclosure;

FIG. 2 is a flow diagram of a method for setting different temperature levels at which operation of an expansion module is reduced in accordance with embodiments of the present disclosure;

FIG. 3 is a flow diagram of a method for managing operation of an expansion module in a closed loop system based on set temperature levels in accordance with embodiments of the present disclosure;

FIG. 4 is a flow diagram of a method for managing operation of an expansion module in an open loop system based on a set temperature level in accordance with embodiments of the present disclosure; and FIG. 5 are diagrams depicting set temperature levels during expansion module operation in an open loop system and a closed loop system in accordance with embodiments of the present disclosure.

SUMMARY

The presently disclosed subject matter relates to computing device expansion modules and control of their operation based on temperature. According to an aspect, an expansion module includes an interface configured to operably connect to a computing device including a service manager. Further, the expansion module includes a controller configured to determine whether communication with the service manager of the computing device is enabled or not enabled. The controller is also configured to set a first temperature level at which operation of the expansion module is reduced in response to determining that communication with the service manager is enabled. Further, the controller is configured to set a second temperature level at which operation of the expansion module is reduced in response to determining that communication with the service manager is not enabled. The second temperature level is lower than the first temperature level.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. A computing device can also include any type of conventional computer, for example, a laptop computer or a tablet computer. Although many of the examples provided herein are implemented on servers, the examples may similarly be implemented on any other suitable computing device.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the term "computing device" should be broadly construed. Example computing devices include, but are not limited to, a server, a desktop computer, a laptop computer, and the like.

As referred to herein, the terms "expansion module," "adapter card," and "accessory card" should be broadly construed and should be understood to be interchangeable. An expansion module may be operably connected (i.e., electrically connected) to a computing device for adding to or supplementing the functionality of the computing device. As an example, an expansion module may include a printed circuit board (PCB), an interface (or edge connector), and an expansion bus (or computer bus). The interface can include hardware, software, and/or firmware that can operably connect to a computing device such that data can be exchanged between the computing device and peripheral devices. Example expansion modules include, but are not limited to, a network card, a sound card, a video card, a storage card, a graphics processing unit (GPU), and are implemented in the form factor of a peripheral component interconnect express (PCIe) card, an Open Compute Platform (OCP) card, a motherboard implementation such as a Local Area Network on motherboard (LOM), or any other standard or custom form factor.

As referred to herein, the term "service manager" should be broadly construed. The service manager may be part of a computing device and operable to monitor the state of the computing device. For example, the service manager may be a baseboard management controller (BMC) or other suitable hardware, software, firmware, or combinations thereof for monitoring the computing device and/or for implementing other functionality described herein for the service manager. As an example, a BMC may include a processor configured to monitor the physical state of a computing device using sensors. The BMC may be part of an Intelligent Platform Management Interface (IPMI) and may reside in a motherboard or main circuit board of a computing device to be monitored. The sensors of a BMC can measure internal physical variables such as temperature, humidity, power-supply voltage, fan speeds, communications parameters and operating system (OS) functions. An administrator may be notified in response to detecting that any of these variables happen to meet a predefined threshold level such that suitable action may be taken. In another, the BMC may also receive notification from an expansion module of its temperature condition and adjust fan speed based on the indicated temperature condition.

FIG. 1 illustrates a block diagram of an expansion module 100 and computing device 102 that are operably connected in accordance with embodiments of the present disclosure. Referring to FIG. 1, the expansion module 100 includes a card edge connector 104, which may generally be referred to as an "interface," that operably connects electronic components of the expansion module 100 to the computing device 102. Particularly, the connector 104 may mechanically and electronically couple to a socket 106 of the computing device 102. In this figure, the expansion module 100 is shown as being operably connected to the computing device 102 via the connector 104 and the socket 106, and it should be understood to those of skill in the art that the expansion module 100 may be operably disengaged from the computing device 102 by disconnecting the connector 104 from the socket 106. When operably connected, the expansion module 100 may add to or supplement the functionality of the computing device 102.

The expansion module 100 may include a controller 108 configured to determine whether communication with a service manager 110 (e.g., a BMC) of the computing device 102 is enabled or not enabled, to set a first temperature level at which operation of the expansion module 100 is reduced in response to determining that communication with the service manager 110 is enabled, and to set a second temperature level at which operation of the expansion module 100 is reduced in response to determining that communication with the service manager 110 is not enabled. Therefore, in this embodiment, the controller 108 sets one of two different temperature levels depending on whether communication with the service manager 110 is enabled or not. The controller 108 may be implemented by hardware, software, firmware, or combinations thereof for implementing the functionality described herein. For example, the controller 108 may include suitable logic circuitry 111 for implementing some or all of the functionality described herein.

The term "closed loop system" may be used to refer to a configuration of the expansion module 100 and the computing device 102 such that communication from the expansion module 100 to the service manager 110 is enabled. For example, the controller 108 may determine whether communication with the service manager 110 is enabled based on whether communication via Management Component Transport Protocol (MCTP) is operable. In another example, in a closed loop system the expansion module 100 can send thermal notifications to the service manager 110 of the computing device 102 to indicate when various temperature thresholds have been reached. In the instance of a closed loop system, the service manager 110 may respond to indication that a temperature threshold has been reached by controlling a fan to increase its rotation speed.

In contrast to a closed loop system, the term "open loop system" may be used to refer to a configuration of the expansion module 100 and the computing device 102 such that communication from the expansion module 100 to the service manager 110 is not enabled. For example, in the open loop system there is no support for communicating, from the expansion module 100, thermal notifications to the service manager 110, and/or other communications to the service manager 110. Therefore, in an open loop system, the expansion module 100 is unable to notify the service manager 110 of a temperature reading of the expansion module 100 or that a temperature threshold has been reached such that the service manager 110 may take action based on the notification. The service manager 110 may, in the open loop system, detect presence of the expansion module 100 and by use of a lookup table or the set a fan to a value that can cool in response to determining a severe or "worst-case" temperature condition that the expansion module 100 may be expected to experience.

The expansion module 100 may include a temperature sensor 114 configured to detect a temperature of the expansion module 100 generally or a component of the expansion module 100. The temperature sensor 114 may communicate to the controller 108 an electrical signal indicating the detected temperature. The controller 108 may compare the detected temperature to determine whether it meets or exceeds a set temperature level in accordance with embodiments of the present disclosure.

The computing device 102 may include an I/O module 116 configured to manage communications between the service manager 110 and the controller 108 via the connector 104 and the socket 106. Further, the computing device 102 may include one or more processor(s) 118 and memory 120 for implementing functionality of the computing device 102 as will be understood by those of skill in the art. The computing device 102 may also include a fan 122 that is controllable by the service manager 110. For example, the computing device 102 may control the speed of the fan 122.

FIG. 2 illustrates a flow diagram of a method for setting different temperature levels at which operation of an expansion module is reduced in accordance with embodiments of the present disclosure. The method is described by example as being implemented by the expansion module 100 and the computing device 102 shown in FIG. 1. As an example, the method may be implemented by the controller 108 shown in FIG. 1.

Referring to FIG. 2, the method includes determining 200 whether communication with a service manager of a computing device is enabled or not enabled. For example, the expansion module 100 may be operably connected to the computing device 102 shown in FIG. 1. Further, the controller 108 may determine whether with the service manager 110 of the computing device 102 is enabled or not enabled. As an example, the controller 108 may determine whether communication with the service manager is enabled or not enabled by use of MCTP or another suitable protocol for communicating with the service manager. The method proceeds to block 202 in response to determining that communication is enabled. Conversely, the method proceeds to block 204 in response to determining that communication is not enabled.

As an example of determining whether communication with a service manager is enabled or not, the controller 108 may recognize or determine whether the expansion module 100 has been assigned a communication identifier, such as an endpoint identification (EID). The controller 108 may be aware of assignment of the communication identifier and can participate in its assignment. In response to this assignment, the controller 108 may determine or recognize that it is in a closed loop system such that communication with the service manager 110 is available. Otherwise, if there is not a current assignment of a communication identifier, the controller 108 may determine or recognize that it is in an open loop system such that communication with the service manager 110 is unavailable.

At block 202, the method of FIG. 2 includes setting a first temperature level at which operation of the expansion module is reduced. Continuing the aforementioned example, the controller 108 may set in its memory 112 instruction and information about a first temperature level at which operation of the expansion module 100 is reduced. In this example, when the first temperature level is reached, the controller 108 may initiate self-shutdown of the expansion module. This first temperature level may be higher than the temperature level that is referred to as a "fatal temperature" for an open loop system. The actions taken by the controller 108 at the first temperature level may be the same as the actions taken by the controller 108 in an open loop system when the "fatal temperature" is reached. This may include an abrupt, unordered termination of all communications with computing device 102 and an immediate transition into a deep sleep state or any other actions at the disposal of the controller 108 to prevent erroneous data from being exchanged with computing device 102 as a result of the elevated temperature. These actions would be unexpected by computing device 102 and most likely would be detrimental to the overall operation of computing device 102. Also, in response to determining that communication with the service manager 110 is enabled, the controller 108 may maintain or set in memory another temperature level that is lower than the first temperature level. The other temperature level may be the same or close to the fatal temperature for an open loop system. Further, at this other temperature level, the controller 108 may notify the service manager 110 to reduce or halt operations with the expansion module 100. Upon receipt of the notification to halt operations, the service manager 110 may initiate an orderly shutdown of operations with the expansion module 100. This shutdown of operations may include an ordered termination of further communications with controller 108, a removal of power to expansion module 100, or any other method at the disposal of the service manager 110 to prevent erroneous data from being exchanged with the expansion module 100 as a result of the elevated temperature. An orderly termination of operation may not be detrimental to the overall operation of computing device 102.

At block 204, the method of FIG. 2 includes setting a second temperature level at which operation of the expansion module is reduced. The second temperature level is different than the first temperature level. Continuing the aforementioned example, the controller 108 may set in its memory 112 instruction and information about a second temperature level at which operation of the expansion module 100 is reduced. In this example, the second temperature level is less than the first temperature level. For example, the controller 108 may store in memory 112 another temperature value N, different than the temperature value M, that is a different trigger for reducing operation or halting operation of the expansion module 100. As an example, when the second temperature level is reached, the controller 108 may initiate self-shutdown of the expansion module.

FIG. 3 illustrates a flow diagram of a method for managing operation of an expansion module in a closed loop system based on set temperature levels in accordance with embodiments of the present disclosure. The method is described by example as being implemented by the expansion module 100 and the computing device 102 shown in FIG. 1. As an example, the method may be implemented by the controller 108 shown in FIG. 1.

Referring to FIG. 3, the method includes determining 300 a temperature of an expansion module. For example, the expansion module 100 may be operably connected to the computing device 102 shown in FIG. 1. Also, the expansion module 100 may be implementing one or more operations for the computing device 102. As a result, the operating temperature of the expansion module 100 increases. The temperature sensor 114 may detect a temperature of the expansion module 100 and output an electrical signal representative of the temperature to the controller 108. The controller 108 may determine the temperature based on the received signal. The controller 108 may continuously, periodically, or otherwise regularly determine the temperature based on the received signal from the temperature sensor 114.

The method of FIG. 3 includes determining 302 that communication with a computing device is enabled. Continuing the aforementioned example, the controller 108 can determine that communication with the computing device 102 is enabled. For example, the controller 108 may recognize or determine whether the expansion module 100 has been assigned a communication identifier, such as an endpoint identification (EID). If this is determined, then the controller 108 may recognize or deduce that communication with the computing device 102 is enabled.

The method of FIG. 3 includes determining 304 whether the temperature is at or above a first temperature level. Continuing the aforementioned example, the controller 108 may determine whether the temperature detected by the temperature sensor 114 is at or above a set temperature level. This set temperature level may be the lower temperature level set for operations of the expansion module 100 in a closed loop system with the computing device 100. Also, this set temperature level may be lower than a second temperature level set for operations of the expansion module 100 in a closed loop system with the computing device 100. The first temperature level may be a temperature level at which the controller 108 sends a message to the service manager 110 with an instruction to shut down operations with the expansion module 100 due to the high temperature reading corresponding to the first temperature level. In response to receipt of the instruction, the service manager 110 may halt operations with the expansion module 100. If it is determined at block 304 that the temperature is not at or above the first temperature level, then the controller 108 may continue to monitor the temperature condition at block 304. Otherwise, if it is determined at block 304 that the temperature is at or above the first temperature level, the method may proceed to block 306 where the controller 108 communicates a message to a service manager of the computing device to reduce or halt operations with the expansion module.

With continuing reference to FIG. 3, the method includes determining 308 whether the temperature is at or above a second temperature level. Continuing the aforementioned example, the controller 108 may determine whether the temperature detected by the temperature sensor 114 is at or above a set second temperature level. This second temperature level may be higher than the first temperature level. The second temperature level may be a temperature level at which the controller 108 conducts a self-shutdown of the expansion module 100 in the closed loop system with the computing device 100. If it is determined at block 308 that the temperature is not at or above the second temperature level, then the controller 108 may continue to monitor the temperature condition at block 308. Otherwise, if it is determined at block 308 that the temperature is at or above the second temperature level, the method may proceed to block 310 where the controller 108 initiates self-shutdown or reduction of operations at the expansion module 100.

It is noted that in the method of FIG. 3, the temperature of the expansion module 100 may reduce at any time. For example, the temperature may reduce even after exceeding either the first temperature level or the second temperature level. In either of these cases, the method may return to a previous block such as blocks 304 or 306 in response to the controller 108 determining that the temperature reduced to below one of the first temperature level or the second temperature level. In the instance of the temperature reducing lower than the first temperature level or the second temperature level, the controller 108 may control the expansion module 100 to resume normal operations and/or may communicate instruction to the service manager 110 to resume normal operations.

In accordance with embodiments, when operating in a closed loop system with the computing device 102, the expansion module 100 may be set with one or more temperature levels in addition to the aforementioned first and second temperature levels. For example, the controller 108 may set in memory 112 a temperature level at which a warning message about a temperature level of the expansion module 100 is sent to the service manager 110. This temperature level associated with the warning message may be lower than any of the other set temperature levels. Upon receipt of the warning message, the service manager 110 may control the fan 122 to increase its fan speed. Further, upon detection of a temperature lower than this set temperature level, the controller 108 may send another message to the service manager 110 about the lower temperature condition such that the fan speed can be lowered or resume normal operations.

In another example of a temperature level, when operating in a closed loop system with the computing device 102, the controller 108 may set in memory 112 a temperature level at which a critical message about a temperature level of the expansion module 100 is sent to the service manager 110. This temperature level associated with the critical message may be higher than the temperature level associated with the aforementioned warning message. Upon receipt of the critical message, the service manager 110 may control the fan 122 to increase its fan speed to maximum output. Further, upon detection of a temperature lower than this set temperature level, the controller 108 may send another message to the service manager 110 about the lower temperature condition such that the fan speed can be lowered or resume normal operations.

FIG. 4 illustrates a flow diagram of a method for managing operation of an expansion module in an open loop system based on a set temperature level in accordance with embodiments of the present disclosure. The method is described by example as being implemented by the expansion module 100 and the computing device 102 shown in FIG. 1. As an example, the method may be implemented by the controller 108 shown in FIG. 1.

Referring to FIG. 4, the method includes determining 400 a temperature of an expansion module. For example, the expansion module 100 may be operably connected to the computing device 102 shown in FIG. 1. Also, the expansion module 100 may be implementing one or more operations for the computing device 102. As a result, the operating temperature of the expansion module 100 increases. The temperature sensor 114 may detect a temperature of the expansion module 100 and output an electrical signal representative of the temperature to the controller 108. The controller 108 may determine the temperature based on the received signal. The controller 108 may continuously, periodically, or otherwise regularly determine the temperature based on the received signal from the temperature sensor 114.

The method of FIG. 4 includes determining 402 that communication with a computing device is not enabled. Continuing the aforementioned example, the controller 108 can determine that communication with the computing device 102 is not enabled. For example, the controller 108 may recognize or determine whether the expansion module 100 has not been assigned a communication identifier, such as an endpoint identification (EID). If this is determined, then the controller 108 may recognize or deduce that communication with the computing device 102 is not enabled.

The method of FIG. 4 includes determining 404 whether the temperature is at or above a set temperature level. Continuing the aforementioned example, the controller 108 may determine whether the temperature detected by the temperature sensor 114 is at or above a set temperature level. The set temperature level may be a temperature level at which the controller 108 conducts a self-shutdown of the expansion module 100 in the open loop system with the computing device 100. If it is determined at block 404 that the temperature is not at or above the set temperature level, then the controller 108 may continue to monitor the temperature condition at block 404. Otherwise, if it is determined at block 404 that the temperature is at or above the set temperature level, the method may proceed to block 406 where the controller 108 initiates self-shutdown or reduction of operations at the expansion module 100.

FIG. 5 illustrates diagrams depicting set temperature levels during expansion module operation in an open loop system and a closed loop system in accordance with embodiments of the present disclosure. Referring to FIG. 5 on the left side, a temperature scale is provided for the open loop system and the upward direction designates an increase in temperature. At the indicated "Fatal Temperature" for the open loop system, an expansion module can conduct a self-shutdown.

On the right side of FIG. 5, a temperature scale is provided for the closed loop system and the update direction designates an increase in temperature. The scale indicates that at the lowest set temperature level, a warning message may be sent to the computing device to ramp up fan speed. Further, at the next highest set temperature level, a critical message may be sent to the computing device to maximize fan speed at the computing device. The next highest set temperature corresponds to the fatal temperature at which a "fatal message" may be sent to the computing device to allow the BMC to shut down the system. Then at the highest set temperature level the expansion module can conduct a self-shutdown.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. An expansion module comprising:
   an interface configured to operably connect to a computing device including a service manager; and
   a controller configured to:
   determine whether communication with the service manager of the computing device is enabled or not enabled;
   set a first temperature level at which operation of the expansion module is reduced in a closed loop operation wherein a detected temperature is communicated to the service manager in response to determining that communication with the service manager is enabled; and
   set a second temperature level at which operation of the expansion module is reduced in an open loop operation wherein the detected temperature is not communicated to the service manager in response to determining that communication with the service manager is not enabled, wherein the second temperature level is lower than the first temperature level.

2. The expansion module of claim 1, wherein the service manager comprises a baseboard management controller (BMC) of the computing device.

3. The expansion module of claim 1, wherein the controller is configured to determine whether communication with the service manager is enabled by use of Management Component Transport Protocol (MCTP).

4. The expansion module of claim 1, wherein the controller is configured to:
determine that the detected temperature is at the first temperature level and communication with the service manager is enabled; and
reduce operation of the expansion module in response to determining that the detected temperature is at the first temperature level and communication with the service manager is enabled.

5. The expansion module of claim 1, wherein the controller is configured to:
determine that the detected temperature is at a third temperature level and communication with the service manager is enabled, wherein the third temperature level is less than the first temperature level; and
communicate, in the closed loop operation, a message to the service manager to reduce or halt operations with the expansion module in response to determining that the detected temperature is at the third temperature level and communication with the service manager is enabled.

6. The expansion module of claim 5, wherein the second temperature level and the third temperature level are the same.

7. The expansion module of claim 1, wherein the controller is configured to:
determine that the detected temperature is at the second temperature level and communication with the service manager is not enabled; and
reduce operation of the expansion module, in the open loop operation, without communicating temperature information to the service manager in response to determining that the detected temperature is at the second temperature level and communication with the service manager is not enabled.

8. The expansion module of claim 1, wherein the controller is configured to determine whether communication with the service manager is enabled or not enabled based on whether an identifier has been assigned for communication with the computing device.

9. The expansion module of claim 1, wherein the controller is configured to:
set a third temperature level that is lower than the first and second temperature levels;
determine that a temperature of the expansion module at the third temperature level is detected; and
communicate, in a closed loop operation, a message to the service manager to increase fan speed in response to determining that a temperature of the expansion module at the third temperature level is detected.

10. The expansion module of claim 9, wherein the controller is configured to:
set a fourth temperature level that is lower than the first and second temperature levels, and that is higher than the third temperature level;
determine that a temperature of the expansion module at the fourth temperature level is detected; and
communicate, in a closed loop operation, a message to the service manager to increase fan speed to a maximum fan speed in response to determining that a temperature of the expansion module at the fourth temperature level is detected.

11. A method comprising:
at an expansion module:
determining whether communication with a service manager of a computing device is enabled or not enabled;
setting a first temperature level at which operation of the expansion module is reduced in a closed loop operation wherein a detected temperature is communicated to the service manager in response to determining that communication with the service manager is enabled; and
setting a second temperature level at which operation of the expansion module is reduced in in an open loop operation wherein the detected temperature is not communicated to the service manager response to determining that communication with the service manager is not enabled, wherein the second temperature level is lower than the first temperature level.

12. The method of claim 11, wherein the service manager comprises a baseboard management controller (BMC) of the computing device.

13. The method of claim 11, further comprising determining, at the expansion module, whether communication with the service manager is enabled by use of Management Component Transport Protocol (MCTP).

14. The method of claim 11, further comprising, at the expansion module:
determining that the detected temperature is at the first temperature level and communication with the service manager is enabled; and
reducing operation of the expansion module in response to determining that the detected temperature is at the first temperature level and communication with the service manager is enabled.

15. The method of claim 11, further comprising, at the expansion module:
determining that the detected temperature is at a third temperature level and communication with the service manager is enabled, wherein the third temperature level is less than the first temperature level; and
communicating, in the closed loop operation, a message to the service manager to reduce or halt operations with the expansion module in response to determining that the detected temperature is at the third temperature level and communication with the service manager is enabled.

16. The method of claim 15, wherein the second temperature level and the third temperature level are the same.

17. The method of claim 11, further comprising, at the expansion module:
determining that the detected temperature is at the second temperature level and communication with the service manager is not enabled; and
reducing operation of the expansion module, in the open loop operation, without communicating temperature information to the service manager in response to determining that the detected temperature is at the second temperature level and communication with the service manager is not enabled.

18. The method of claim 11, further comprising determining, at the expansion module, whether communication with the service manager is enabled or not enabled based on whether an identifier has been assigned for communication with the computing device.

19. The method of claim 11, further comprising, at the expansion module:
setting a third temperature level that is lower than the first and second temperature levels;

determining that a temperature of the expansion module at the third temperature level is detected; and communicating, in a closed loop operation, a message to the service manager to increase fan speed in response to determining that a temperature of the expansion module at the third temperature level is detected.

20. The method of claim 19, wherein the controller is configured to:

set a fourth temperature level that is lower than the first and second temperature levels, and that is higher than the third temperature level;

determine that a temperature of the expansion module at the fourth temperature level is detected; and communicate, in a closed loop operation, a message to the service manager to increase fan speed to a maximum fan speed in response to determining that a temperature of the expansion module at the fourth temperature level is detected.

\* \* \* \* \*